Dec. 5, 1939.   R. L. KAHN   2,182,438
GEAR SHIFTING MECHANISM
Original Filed Nov. 27, 1936
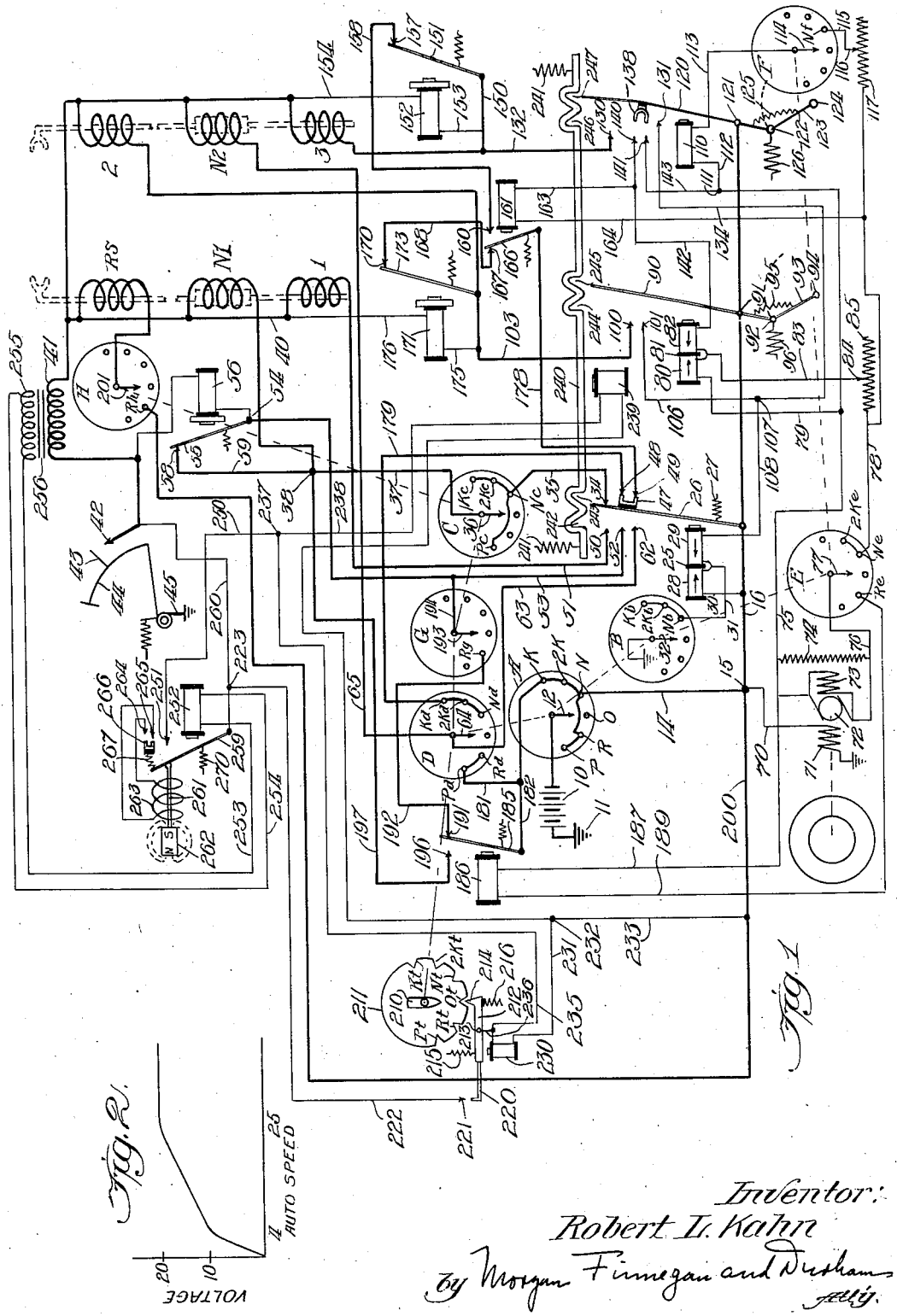
Inventor:
Robert L. Kahn
by Morgan Finnegan and Durham
Atty.

Patented Dec. 5, 1939

2,182,438

UNITED STATES PATENT OFFICE 2,182,438

GEAR SHIFTING MECHANISM

Robert L. Kahn, Chicago, Ill.

Application November 27, 1936, Serial No. 112,845
Renewed February 2, 1938

24 Claims. (Cl. 74—334)

This invention relates to gear shifting mechanism, and more particularly to an automatic electric gear shifting mechanism for use in automobiles or the like, where the gear ratio between the engine and the final power consumption means must be varied. Electric gear shifts for automobiles are quite old, but as a rule are merely the electric analogue of the ordinary mechanical gear shift. In such systems the operator merely presses a button to operate on the gear shift instead of moving the conventional handle. In this system, however, I preferably have means which will automatically condition itself in response to the vehicle speed for selecting the correct gear ratio for that particular speed. While I have illustrated this system in connection with a conventional three speed and reverse gear shift, it is to be understood that the system may be adapted by anyone skilled in the art to a larger number of speeds.

In general, this system contemplates the use of an electric generator rotatively coupled to the wheels of the automobile, which in this case represents the load. The generator is so designed that its output is delivered at a voltage proportionate to the speed of rotation of the wheels or the speed of travel of the automobile. Above about 30 miles per hour, and above which speed no further gear shifting is necessary in the conventional automobile, the generator is preferably so designed that its voltage tapers off to a steady value. For example, this generator may generate current at one volt for every mile per hour of automobile speed. This arbitrary value may be varied as desired, and is merely chosen in this instance for ease of illustration.

A system of relays is fed by the generator and these relays are so designed as to be responsive to different voltage ranges. The various relays control suitable solenoids in the gear box. The first relay in the order of operation is immediately energized upon the operator putting the entire system in working condition. This first relay controls the first speed position, and the actual gear shifting is effected by a clutch controlled switch. This clutch may be depressed by the operator in the usual fashion or may be automatically depressed when the engine is cut down to idling by closing of the gas supply. In either case, the operating circuit is not completed until the clutch is disengaged.

As the car speed is increased, speed responsive relays select the appropriate operating solenoid, and upon the disengagement of the clutch, the desired gear shift change is effected.

Thus the first speed responsive relay may operate between 4 and 10 miles per hour of car speed. The second speed responsive relay may operate from 10 miles per hour to 20 miles per hour. The relays are so designed that they close in the upper portion of the operating range and open in the lower portion of the operating range. Thus the first speed responsive relay, which controls second speed, may close at car speeds of 8 to 10 miles per hour, and after being closed, will open only when the car speed drops down below 4 miles per hour. For the second speed responsive relay, which controls the high speed, the relay may close at speeds of 18 miles per hour and up, and open at speeds below 10 miles per hour. By thus providing a spread between the closing and opening speeds, stable operation of the system is assured.

The relays are suitably interlocked, so that no more than one speed selection is possible at any one time.

In addition, manually controlled switching means is provided for selectively disabling the high speed relay or both high and medium speed relays to permit shifting to second or low for purposes of braking and independently of the car speed.

A reverse position is provided and so designed that no shifting into reverse is possible unless the car speed is substantially zero. In the event that the car speed is above a safe value for shifting into reverse, the mechanism merely shifts into neutral and will remain thus until the speed of the car drops to zero.

A parking position is also provided to bring the transmission into neutral and keep it there.

Interlocking means are provided whereby during the energization of the gear shifting solenoids, all circuits under manual or speed control are maintained in status quo. Hence no clashing or sudden circuit changes are possible during this period of solenoid energization.

Referring to the drawing, Figure 1 is a circuit diagram of the system. Figure 2 is a characteristic curve of the speed responsive generator.

The customary automobile battery 10, grounded at 11, is connected to the rotor 12 of a switch section A. This switch section is part of a gang switch and the rotor of each section is adapted to make contact at various positions. Such switches with indexing means are well known in the electrical art and need not further be described. The switch is provided with six definite positions indicated on each section as follows: O for off, N for running position, 2K for braking in second speed, K for braking in low speed, R for reverse and P for parking in neutral or keeping in neutral independently of speed.

With the exception of the O position, all contacts on the A section are connected together to wire 14 and a junction point 15. From point 15, a lead 16 runs to the armatures of three forward speed control relays. The first relay 25 will be referred to as the no-speed responsive relay for the reason that it becomes active when the system is energized in preparation for low speed. Its armature 26, biased in open position by spring 27, is connected to lead 16. Relay 25 has equal and opposite windings 28 and 29. Winding 28 is connected by wire 30 to lead 16. The two inner ends of the windings are connected by lead 31 to contacts Nb, 2Kb and Kb of switch section B. The rotor 32 thereof is grounded.

No-speed responsive relay armature 26, in its off position bears against a contact 34 which is connected by a lead 35 to the Nc, 2Kc, Kc and Pc contacts of switch section C. Rotor 36 is connected by wire 37 to high side 38 of solenoid N1 controlling the neutral position between reverse and low speed in the standard gear shift. Solenoid N1 has its low side connected to a bus-bar 40 which runs through a transformer primary 41 to a fixed clutch switch contact 42. This is adapted to cooperate with a movable contact 43 carried by clutch pedal 44 grounded at 45.

Armature 26 also carries a bridge 47 insulated therefrom and adapted to cooperate with contacts 48 and 49, of which more will be said later in connection with the speed responsive relays.

Armature 26, when closed, bears against three contacts. Contact 50 is connected by lead 51 to the high side of solenoid 1, whose low side is connected to bus 40. Contact 52 is connected by lead 53 to point 54 of delay relay armature 55. The winding of the relay 56 is connected between point 54 and clutch contact 42. Armature 55 is spring biased to an open position against contact 58 connected by wire 59 to high side 38 of N1.

Contact 62 of the no-speed responsive relay is connected by wire 63 to rotor 64 of switch section D. This lead 63 continues on as lead 65 to the high side of solenoid N2.

In connection with the two speed responsive relays, it will be necessary to describe the speed responsive generator. From junction 15, a lead 70 goes down to a grounded field coil 71 of a generator 72. This generator is driven from any portion of the automobile which moves with the wheels thereof as distinguished from the automobile engine. Across the armature of generator 72 a compounding field coil 73 may be connected if desired.

The generator preferably has a steep rising voltage characteristic from zero up to about four miles per hour of car speed. From four miles per hour up to about twenty-five, the characteristic curve rises less steeply to about 20 volts and from that speed on, the voltage remains stationary since no further shifting is necessary generally. It is understood of course, that these characteristic curve valves are merely suggestive and may be varied depending upon the optimum shifting speeds and characteristics of the speed responsive relays.

Generator 72 feeds its output to lines 75 and 76. Across these lines, a load resistor 74 may be connected to stabilize the generator operation. Line 76 goes to rotor 77 of switch section E, whose contacts Ne and 2Ke are connected to a line 78. From line 75, a wire 79 goes to one winding 80 of a relay 81. This relay, which is one of two speed responsive relays, has an equal and opposite winding 82. The inside leads to both windings are connected together by lead 83 down to a slider 84 of a resistance 85 connected to line 78.

Relay 81 is adapted to open at one voltage and close at a higher voltage. For this purpose, its armature 90 is pivoted at 91 and at its lower end is pivotally connected at 92 to an arm 93 rotatably mounted at 94. Armature 90 and arm 93 together form a toggle. A spring 95 is connected across intermediate points on armature 90 and arm 93 and tends to keep the toggle set in either extreme position. A spring 96 is connected to pivot 92 and tends to keep the toggle in the position shown with armature 90 in the off position. By having spring 95 weaker than 96, it is clear that upon deenergization of relay 81, the toggle will be sprung back from an on position of the armature. Since weaker spring 95 opposes any change in the toggle position, the attractive force on armature 90 necessary to spring the toggle will be greater than the force necessary to hold the toggle in its off position. Hence by proper design of the armature toggle system and bearing in mind the generator characteristics, it is possible to have a car speed of 8–10 miles per hour before the armature will close while the car speed could drop to about 4 miles per hour before the armature is released.

For mechanically stable operation of the toggle system, it is desirable that spring 95 be substantially weaker than spring 96. Obviously, spring 95 must be weak enough to permit spring 96 to pull the toggle back. By proper choice and adjustment of springs and by adjustment of generator characteristics, a desired relay operation as above indicated may be obtained.

Because the voltage differential between which the relay operates should be smaller than the release voltage, due to the relative spring strengths, the generator characteristic is steep at first and then tapers off during the shifting speeds. Hence a heavy base current is provided to go with the heavy spring 96. However, substantially the same effects may be obtained by so designing the magnetic circuit of the relay, that the base current coresponding to the first four or five miles per hour of car speed, results in a high flux density but as the current goes up, the flux density increases slightly. The base current would therefore be just enough to create a pull on the armature to balance the heavy spring. The increment, when great enough would take care of the toggle spring. When releasing, with the incremental field wiped out, the main field would not hold the armature since the increased tension of spring 96 would be enough to take care of the toggle spring. It is evident that the operation of the relay in relation to car speed is merely a matter of design of various parts.

Armature 90 of the relay, in its closed position bears against two contacts 100 and 101. Contact 100 is connected by lead 103 to solenoid 2 controlling the second speed position. This solenoid is connected at its low side to bus 40. Contact 101 is connected by lead 106, junction 107 and lead 108 back to reverse winding 29 of the no-speed relay 25.

The second speed responsive relay 110, controlling high speed, has one winding only. Line 75 is continued on to junction 111 from which a wire 112 goes to one terminal of the relay winding. The other terminal is connected by wire 113 to rotor 114 of switch section F. Only one contact, Nf, of this section is connected by wire 115 to slider 116 cooperating with resistance 117 connected to line 78. Relay 110 has an armature 120 pivoted at 121 and having its free end pivotally joined at 122 to a toggle arm 123 rotatively mounted at 124. Spring 125 is connected across from arm 123 to armature 120 while a heavier spring 126 is connected to pivot 122 and tends to keep the toggle in the position shown. By adjustment and design of the relay and toggle system, it may be made to operate between car speeds of 10 and 20 miles per hour. If desired the toggle system of this relay may have the same spring constants as that of relay 81 and reliance be had upon cutting down the applied voltage by resistance 117. By manual adjustment of resistances 85 and 117, changes may be made by the car operator in the shifting speed ranges for city driving, country driving or hilly driving.

Armature 120, when closed, cooperates with contacts 130 and 131. Contact 130 is connected by lead 132 to solenoid 3, whose low end is connected to bus 40. Contact 131 is connected by wire 134 back to point 107. Armature 120 carries a yoke 138, insulated therefrom, which connects two contacts 140 and 141 together in the closed position. Contact 140 is connected by wire 142 back to the neutralizing winding 82 of the other speed responsive relay 81. Contact 141 is connected by lead 143 to point 111.

For the purpose of energizing the neutral solenoid N2 in shifting into second or third speed, the following is provided. From lead 132 going to solenoid 3, a wire 150 branches off to armature 151 of a delay relay 152. The winding of the relay is connected by wire 153 to wire 150 and by wire 154 to bus bar 40. Armature 151 is spring biased in open position against contact 157 connected by wire 158 down to a contact 160 of a quick acting sensitive relay 161. This relay has its winding connected by lead 163 to wire 142 and by lead 164 to lead 78. The relay 161 has its armature 166 spring biased in open position against a contact 167 which is connected by wire 168 to contact 170 of another delay relay 171. This second speed delay relay has its armature 173 spring biased against contact 170 and the armature is connected to lead 103 going to solenoid 2. The relay winding is likewise connected by wire 175 to lead 103 and by wire 176 to bus 40.

Armature 166 of quick acting relay 161 is connected by line 178 to contact 49 of the no speed responsive relay. Contact 48 is connected by line 179 to contacts Nd, 2Kd and Kd of switch section D.

Contacts Rd and Pd are connected by wire 181 to a lead 182 running from the interconnected stator contacts of switch section A to the armature 185 of a reverse relay 186. This relay is quick acting and has its winding connected by lead 187 to generator line 75 and by 189 to Re contact of switch section E. Armature 185 is spring biased in open position against a contact 191 connected by wire 192 to contact Rg of switch section G, whose rotor 193 is connected by wire 194 to line 53. In the closed position of the reverse relay, the armature bears against contact 196 connected by wire 197 to junction 38.

From junction 15, a lead 200 goes to Rh contact of switch section H and the rotor 201 thereof is connected to the high side of reverse solenoid RS.

To operate the gang switch, a handle 210 on switch plate 211 is provided. This plate is provided with indentations Pt to Kt inclusive corresponding to the various switch positions. A locking means is provided consisting of a lever 212 pivoted at 213. This lever has a dog portion 214 adapted to enter the plate indentations. Ordinarily, lever 212 is kept in an unlocked position as shown by spring 215 pulling it against a spring stop 216.

Lever 212 has an extension 220 adapted to cooperate with a contact 221 connected by lead 222 to point 223. An electromagnet 230 is adapted to cooperate with the pivoted lever 212 and cause dog 214 to enter the registering indentation to lock the entire gang switch. The electromagnet 230 is connected by lead 231 to point 232 on line 233 running from lead 200. The other magnet coil lead 235 is connected by a short wire 236 to lever 212 and the lead itself continues on to a point 237. Point 237 is connected by lead 238 to relay locking electromagnet 239 whose other terminal is connected to line 233. This locking magnet is adapted to operate on a long locking lever 240 biased upwardly by springs 241. Lever 240 has a plurality of locking slots 242 to 247 inclusive. These slots are in pairs and are located at the open and closed positions of the various armature tips. When pulled down by the electromagnet, lever 240 locks the various armatures against further movement. Preferably each pair of slots is shaped as shown to provide tapering sides to push the armatures into one or the other position if caught in between.

Point 237 is connected by line 250 to a contact 251 of a locking relay 252. The winding of this relay is connected by leads 253 and 254 to secondary 255 of an iron core transformer 256 whose primary is 41. Relay 252 has its armature 259 connected by wire 260 through point 223 up to clutch switch contact 42. The relay armature is provided with means for permitting a quick closure but slow opening. Any suitable one way dash pot action may be provided. The means shown comprises a rod 261 pivoted to armature 259. Rod 261 carries a magnet 262 which is adapted to be drawn inside of retarding coil 263 whose two terminals are contacts 264 and 265. A short circuiting member 266 carried by a spring 267 engages the retard coil contacts in the closed position of the armature. The spring mounting of the shorting member is provided to permit some retarding travel without unloading the relay armature. A spring 270 on the armature is provided to pull against the retarding action of the coil.

The operation of the system is as follows:

For the present we will disregard the locking portion of the system and bear in mind that the various solenoid coils are only energized when the clutch is depressed. For simplicity sake, we will assume the car is stationary. When the gang switch is turned from O to N, the main battery circuit through switch section A is established. In fact in any position, except O, lead 14 is energized so we can start from point 15 as the energy source.

Current from point 15 goes along lead 16 and through winding 28 of the no speed responsive relay, line 31 goes through Nb contact of switch section B and thence to ground. Hence relay 25 pulls its armature 26 against contacts 50, 52 and 62. Considering contact 62, the main battery circuit goes through lead 63, rotor 64, lead 65 (the circuit from contact Nd is open at relay contact 48) to solenoid N2. Contact 50 supplies current through lead 51 to solenoid 1.

However it is desirable to energize N1 for a short time so that the transmission can be changed from any previous setting to low speed. From contact 52 current goes through lead 53 to point 54 (the G section is open). At point 54, the main circuit continues through armature 55, contact 58, lead 59 and solenoid N1 (lead 197 from point 38 being open at contact 196). Also from point 54, current goes through relay 56 and to bus bar 40. Disregarding transformer 41 for the present, as soon as clutch contacts 42 and 43 close, solenoids N2, N1 and 1 will be energized. Delay relay 56 will also be energized and open solenoid N1 after a time interval to permit shifting from neutral into low.

As the car starts off, generator 72 begins to function to feed current in lines 75 and 78 through switch section E. At the voltage corresponding to about 8 miles per hour, winding 80 of the first speed responsive relay 81 is sufficiently energized to pull armature 90 over. Contact 101 establishes a circuit from no speed relay winding 29, wire 108, point 107, wire 106, armature 90, lead 16 so that both windings of the no speed relay 25 are in parallel to each other with respect to point 15. Hence, the no speed relay 25 with the opposing windings energized releases its armature 26.

Speed responsive relay 81 thus completes a main circuit through contact 100, lead 103 and solenoid 2. To energize N2 for a short time, current from lead 103 goes through delay relay armature 173, contact 170, lead 168, contact 167, armature 166 of relay 161, lead 178, contacts 49 and 48, lead 179 through switch section D, lead 65 to N2. When delay relay 171 opens, the N2 circuit is broken.

At the same time, no speed relay 25 completes a circuit through its contact 34, lead 35, switch section C, lead 37, point 38, solenoid N1. An idle circuit from point 38, lead 59, relay contact 58, armature 55, relay winding 56 to bus bar 40 is also established. This is useless and serves no purpose. The delay action will result in slow movement of armature 55 to open relay circuit and quick return to close the circuit.

Assuming the second speed shift has been accomplished, the car gains more speed. Second speed responsive relay 110 closes by virtue of current from line 75, relay 110, switch section F and line 78. Contact 131 is connected by lead 134 to point 107 so that no speed relay 25 is still open. Contacts 140 and 141 complete the circuit through the neutralizing winding 82 of relay 81 and cause armature 90 to open. Contact 130 completes a circuit through lead 132 to solenoid 3. Upon the closure of contacts 140 and 141, quick acting relay 161 is energized by current from line 75, point 111, lead 143, contacts 141 and 140, lead 142, lead 163, relay winding 161, return lead 164 down to line 78.

To temporarily energize N2, an additional main circuit is established from contact 130, lead 132, wire 150, armature 151 of delay relay 152, contact 157, lead 158, contact 160, armature 166 of quick acting relay 161, closed as pointed out above, lead 178, contacts 49 and 48, lead 179, through switch section D, lead 65 (lead 63 is open at contact 62) to N2. Referring back to delay relay 152, the relay circuit from wire 150, the relay winding and wire 154 to bus bar 40, causes the relay to pull over armature 151 and open the N2 circuit.

Turning the gang switch over to the 2K position merely opens the circuit of the high speed control relay 110 at switch section F. Thus second speed conditions exist and the transmission is shifted into second in spite of the car speed. Turning the gang switch on the K position, opens up the generator line at switch section E and disables both speed responsive relays, permitting shifting to first.

Turning the switch to R for reverse results in the following changes. Reverse solenoid RS is connected through switch section H to lead 200 and junction point 15. Switch section E disables the speed responsive relays and connects reverse relay 186 across the generator through lines 187 and 189. At the same time switch section D establishes a main circuit from section A through section D, line 65 to N2. Thus this solenoid is energized for reverse under all conditions.

Section B disables the no speed relay while section C breaks lead 37 from lead 35.

If the car is stationary or at any permissible low speed, generator 72 will not affect relay 186. Hence the main circuit from section A, armature 185 goes through contact 191, lead 192, through switch section G, lead 194, up lead 53 to point 54. From here on, the circuit conditions are the same as for low speed, i. e., solenoid N1 is energized for a short time and then cut out by delay relay 56. However, if the car is moving enough to operate reverse relay 186—the speed being above a safe shifting value—then armature 185 is pulled over to contact 196. The main circuit goes along lead 197 to point 38. This is similar to second and high speed conditions for N1 since it is continuously energized and the delay relay merely operates idly. Under such conditions, N2, N1 and SR are continuously energized. If the transmission is in reverse already, it will remain there against the pull of N1. Otherwise the transmission will be shifted to neutral and remain there as long as reverse relay 186 is energized.

For parking in neutral, the P position is provided. This changes reverse circuit conditions in switch sections E, G, H and C. Section E de-energizes the reverse relay winding circuit. Section G isolates reverse relay contact 191. Section C connects lines 35 and 37. Hence junction 15 supplies current through no speed relay contact 34, lines 35 and 37 to point 38 and thence solenoid N1. Delay relay 56 operates idly. Solenoid N2 is energized, as in reverse, from section A, lead 182, lead 181, switch section D, lead 65 and N2.

As pointed out before, the solenoid circuits are only energized when the clutch switch is closed. When this happens, the heavy rush of current in primary 41 induces a current in secondary 255. Leads 253 and 254 bring the induced current to relay 252. This causes its armature 259 to be pulled in sharply and close contacts 264 and 265. It will be noted that contact 265 extends further than 264 so that compression of spring 267 will take place before the damping action starts. Hence the relay is kept closed for a short period of time. The damper system is adjusted to keep the armature substantially closed for the longest period of time necessary for shifting to occur. Upon the armature 259 being pulled over, a circuit from clutch contact 42, lead 260, relay armature 259, contact 251, lead 250 to junction point 237 is established. Electromagnets 239 and 230 are in parallel between junction 232, fed from point 15 to junction 237. Hence the closure of the clutch switch results in the two electromagnets pulling down their respective members and locking the speed control relays and gang switch. If the clutch is kept down for longer than any shifting time, the current flow through the transformer primary becomes steady and the locking relay releases. The action of the various delay relays will at all times affect the locking relay so that ample locking time during shifting is obtained.

In the event that the gang switch, for some reason, fails to assume an index position, dog 214 will be pushed down just enough to close contact 221. This results in by-passing the locking relay from point 237, lead 235, wire 236, lever 212, contact 221, lead 222, point 223 and then to the clutch switch. Hence, no control circuit changes are possible.

The transmission itself may be of the standard type having a pair of forks, one for second, neutral and high speeds, and the other for first, neutral and reverse speeds. Preferably these forks are mechanically connected by well known means so that they may not be out of neutral simultaneously. As shown in dotted outline, a core, movable in one set of solenoids, is provided to control each fork. The transmission is preferably provided with some means such as spring detents to lock the various transmission positions. All this is well known in the art.

It may be desirable to provide a dash pot control on the clutch so that if the system operates at all, it will have a sufficient time interval within which to operate completely.

What is claimed is:

1. In a supervisory system, the combination of a plurality of relays each responsive to a different electrical condition, direct current work circuits controlled by said relays, said work circuits having a common return including the primary of a transformer, a secondary for said transformer, electromagnetic locking means for said relays for locking the armatures thereof in one of the end positions thereof, and means controlled by said transformer secondary for actuating said locking means from the rush of current in said work circuit.

2. In an electrical control system, a plurality of relays responsive to different electrical conditions, direct current work circuits controlled by said relays, said work circuits having a common return including the primary of a transformer and being completed by a manually controlled switch, said work circuits having mechanical means operated thereby for a short period of time when energized, a secondary for said transformer, electromagnetically controlled locking means for said relays to lock said relay armatures in one of the end positions thereof, and means actuated by said transformer secondary for energizing said locking means to lock said relays upon the closure of said manual switch during a working period, whereby said relays will not change their setting while said work circuits operate said mechanism.

3. In an automotive transmission, the combination of solenoids for controlling the shifting of said transmission, control relays for said solenoids, circuit connections between said relays and solenoids for effecting transmission shifting in accordance with conditions to which said relays are responsive, a clutch controlled switch in said solenoid circuits for completing said solenoid circuits, a transformer having a primary in each solenoid circuit, a secondary for said transformer, said primary having a rush of current therethrough when said clutch controlled switch is closed for effecting shifting, and means controlled by said transformer secondary for locking said relays against change when a shifting cycle is initiated.

4. In an automotive transmission, a plurality of solenoids adapted to be energized from a direct current source and adapted to effect shifting of the transmission, a plurality of relays for controlling said solenoids, circuit connections between said relays and solenoids for effecting transmission shifting in accordance with conditions to which said relays are responsive, certain of said relays having their armatures joined to levers to form a toggle system for each of such certain relays, a spring for each toggle tending to maintain said toggle in one of its two stable positions, a spring for biasing the entire toggle system in one direction whereby said toggle will break in response to unequal forces, depending from which position it starts, means for generating current at a voltage proportional to the speed of travel of the vehicle, means for impressing said current on said relays and a clutch controlled switch for completing said solenoid circuits to permit shifting in accordance with the position of the relays.

5. In an automotive transmission, a plurality of solenoids for shifting, a plurality of solenoid control relays, circuit connections between said relay and solenoids for effecting transmission shifting in accordance with conditions to which said relays are responsive, certain of said relays having snap acting means including the armatures thereof whereby each relay armature tends to assume one of two stable end positions, means for biasing said snap acting mechanism toward the stable position of each armature corresponding to the open armature position whereby each of the certain relays attracts and releases its armature under substantially different electrical conditions, vehicle speed responsive means for energizing said certain relays to cause said certain relays to close at certain vehicle speeds and open at substantially lower speeds, and a clutch controlled switch for completing said solenoid circuits to permit shifting in accordance with the relay positions.

6. In an automotive transmission, a plurality of direct current solenoids for effecting shifting, a transformer having a primary in each solenoid circuit, a plurality of solenoid control relays, circuit connections between said relays and solenoids for effecting transmission shifting in accordance with conditions to which said relays are responsive, certain of said relays having snap acting mechanism including the armature thereof for providing stable end positions for such armatures, means for biasing said snap acting mechanism toward one stable position corresponding to an open armature position, vehicle speed responsive means for energizing said certain relays to cause each of said certain relays to close at a different vehicle speed and open at a substantially lower speed, a clutch controlled switch for completing said solenoid circuits to permit shifting in accordance with relay conditions, a secondary for said transformer, and means controlled by said secondary for locking said certain relays at the beginning of a shifting cycle against change of position.

7. In an automotive transmission having three speeds forward and one reverse in two opposed series of positions with each series having two speeds and an intermediate neutral position and each position having a controlling solenoid with the solenoids of one series operating on one core, the combination of means responsive to two vehicle speeds for controlling intermediate and high speed solenoids respectively, speed responsive means for controlling the reverse solenoid, means for controlling the low speed solenoid, interlocking means for preventing more than one speed solenoid from being energized at one time, manual means for simultaneously energizing said two neutral solenoids only, means for energizing said two neutral solenoids at the beginning of every shifting cycle and deenergizing the neutral solenoid adjacent the objective transmission position after the initial half of the shifting cycle, manual means for operatively conditioning the control means for the three forward speeds at one time or for conditioning the reverse control means at another time, and interlocking means for all said manual means so that only one active manual position is possible.

8. In an automotive transmission having three speeds forward and one reverse in two opposed series of positions with each series having two speeds and an intermediate neutral position and each position having a controlling solenoid with the solenoids of one series operating on one core, a clutch controlled switch in the solenoid circuits, a transformer having a primary in said solenoid circuits, means responsive to two vehicle speeds for controlling intermediate and high speed solenoids respectively, speed responsive means for controlling the reverse solenoid, means for controlling the low speed solenoid, interlocking means for preventing more than one speed solenoid from being energized at any one time, manual means for conditioning simultaneously said low speed control means and intermediate and high speed control means, manual means for simultaneously energizing only said two neutral solenoids, means for energizing said two neutral solenoids at the beginning of every shifting cycle and deenergizing the neutral solenoid adjacent the objective transmission position after the initial half of the shifting cycle, means for locking the control means for the three forward speeds, a secondary for the transformer, and means actuated by said secondary for energizing said locking means at the initiation of a shifting cycle.

9. In an automotive transmission having three speeds forward and one reverse in two opposed series of positions with each series having two speeds and an intermediate neutral position and each position having a controlling solenoid with the solenoids of one series operating on one core, combination of a clutch controlled switch in every solenoid circuit for initiating a shifting cycle, means for controlling the low speed solenoid, means responsive to two different vehicle speeds for controlling intermediate and high speed solenoids respectively, interlocking means for preventing more than one speed solenoid from being energized at any one time, manual means for operatively conditioning said three forward speed control means, manual means for simultaneously energizing said two neutral solenoids only, speed responsive means for controlling the reverse solenoid, means for energizing said two neutral solenoids for the first half of every shifting cycle and deenergizing the neutral solenoid adjacent the objective transmission position for the last half of the shifting cycle and interlocking means for said manual means so that only one active manual position at one time is possible.

10. The system of claim 9 wherein a transformer is provided, said transformer having a primary in every solenoid circuit, locking means for the three forward speed solenoid control means and means actuated by said transformer secondary for operating said locking means at the beginning of every shifting cycle and retaining said means in locked position for a time substantially equal to a shifting cycle time.

11. In an automotive transmission having three speeds forward and one reverse in two opposed series of positions with each series having two speeds and an intermediate neutral position and each position having a controlling solenoid, with the solenoids of one series operating on one core, the combination of a clutch controlled switch in each solenoid circuit for initiating a shifting cycle, a relay, circuit connections from said relay to the low speed solenoid, a manual switch for controlling said relay circuit, said relay being adapted to close upon circuit energization, a pair of speed responsive relays, connections from said pair of relays to the remaining two forward speed solenoids, means for generating a current of electricity whose magnitude is a function of the vehicle speed, means for impressing said speed responsive currents on said two speed responsive relays, means for biasing said speed responsive relays whereby the armatures operate over different speed ranges, interlocking means for preventing said three relays from energizing more than one forward speed solenoid at any one time, means for energizing said two neutral solenoids at the beginning of every shifting cycle, means for deenergizing the neutral solenoid adjacent the objective transmission position during the last half of the shifting cycle and means for controlling the reverse solenoid, said means including speed responsive means for maintaining said two neutral solenoids continuously energized during the shifting cycle when the vehicle speed is above a predetermined value.

12. In an automotive transmission having three speeds forward and one reverse in two opposed series of positions with each series having two speeds and an intermediate neutral position and each position having a controlling solenoid with the solenoids of one series operating on one core, the combination of a clutch controlled switch in each slenoid circuit for initiating a shifting cycle, a plurality of relays, circuit connections from said relays to said solenoids for controlling the same, means for operating said relays in accordance with predetermined vehicle conditions, a plurality of delay relays in said solenoid circuits, connections between said delay relays and said other relays and solenoids whereby at the initiation of every shifting cycle the two neutral solenoid coils are energized during the first half of the shifting cycle and said delay relays deenergize during the last half of the shifting cycle the solenoid adjacent the objective transmission position.

13. The system of claim 12 wherein a transformer is provided, said transformer having a primary in every solenoid circuit, locking means for said solenoid control relays and means actuated by said transformer secondary for operating said locking means at the beginning of every shifting cycle and maintaining said means locked during an entire shifting cycle.

14. In an automotive transmission having three speeds forward and one reverse in two opposed series of positions with each series having two speeds and an intermediate neutral position and each position having a controlling solenoid with the solenoids of one series operating on one core, the combination of a clutch controlled switch in each solenoid circuit for initiating a shifting cycle, a no speed responsive relay for controlling the low speed solenoid, a pair of speed responsive relays for controlling the intermediate and high speed solenoids, means for generating current at a voltage proportional to the vehicle speed and impressing said current on said two speed responsive relays, manual switching means for operatively conditioning said three relays, means whereby each speed responsive relay closes its armature at a predetermined voltage and releases its armature at a predetermined and substantially lower voltage, circuit connections between said three relays whereby each of the said responsive relays locks out the relays controlling the lower speed solenoids, delay relays connected in each of the neutral solenoid circuits, connections between said speed responsive relays and said neutral solenoids whereby in any position of the first three relays said two neutral solenoids are connected ready to be energized at the beginning of a shifting cycle, connections between said delay relays and other relays and solenoids whereby after the first half of a shifting cycle the neutral solenoid adjacent the objective transmission position is automatically cut out, and manual switching means for disabling said first three relays and operatively conditioning the circuits for energization of the reverse solenoid.

15. The system of claim 14 wherein a relay fed by the speed responsive generator is provided for controlling the reverse solenoid circuits and connections between said reverse relay and said neutral and reverse solenoids are provided whereby at the beginning of a shifting cycle if the vehicle speed is below a predetermined value, said reverse solenoid and two neutral solenoids are energized and the neutral solenoid adjacent the reverse solenoid is thereafter deenergized and whereby if the vehicle speed is above a predetermined value said reverse solenoid and two neutral solenoids are continuously energized.

16. The system of claim 14 wherein a transformer is provided having a primary in every solenoid circuit and wherein locking means are provided for the first three relays, said locking means when energized being adapted to maintain the relays in either of the end armature positions, and means energized from the transformer secondary for actuating said locking means and maintaining said means in locked condition for a period of time substantially equal to the time of a shifting cycle.

17. The system of claim 14 wherein a transformer is provided having a primary in every solenoid circuit, a locking means for the first three relays adapted to maintain the armatures in position while said locking means is energized, locking means on said manual switching means for preventing a change in the switch setting during energization thereof and means actuated by said transformer secondary for energizing said two locking means at the beginning of every shifting cycle and lasting for the duration of a shifting cycle.

18. In an automotive transmission having three speeds forward and one reverse in two opposed series of positions with each series having two speeds and an intermediate neutral position and each position having a controlling solenoid with the solenoids of one series operating on one core, the combination of a clutch controlled switch in each solenoid circuit for initiating a shifting cycle, a no speed responsive relay, connections between said relay and the low speed solenoid, a pair of speed responsive relays, connections between each of said speed responsive relays and the intermediate and high speed solenoids respectively, means for generating a current at a voltage proportional to the vehicle speed, manual switching means for energizing said no speed responsive relay and for impressing said speed responsive voltage on said two speed responsive relays, means for biasing said two speed responsive relays whereby each speed responsive relay closes at different vehicle speeds and opens at different and substantially lower vehicles speeds, interlocking means among said three relays whereby upon the closing of any one relay, the relays below it in the order of operation are automatically locked out, a plurality of delay relays in the neutral solenoid circuits, circuit connections between said delay relays and said first three relays whereby upon the initiation of a shifting cycle said two neutral solenoids are energized during the first half of the cycle and the solenoid adjacent the final transmission position is deenergized during the last half of the transmission cycle, manual switching means interlocked with said first named manual switching means for operatively conditioning the reverse solenoid in preparation for shifting in that position, a reverse control relay, connections controlled by said manual switching means whereby for reverse shifting speed responsive current is impressed thereon, circuit connections with said manual switching means whereby upon reverse switching position said two neutral solenoids are energized, circuit connections between said speed responsive reverse control means and the neutral solenoid adjacent the reverse solenoid whereby said neutral solenoid is continuously energized when said vehicle speed is above a safe shifting value and is only energized for the first half of a shifting cycle when the vehicle speed is at a safe shifting value.

19. The system of claim 18 wherein switching means are provided for disabling the high speed solenoid controlling speed responsive relay independently of vehicle speed conditions to permit intermediate speed shifting conditions to obtain.

20. The system of claim 18 wherein locking means for the first three relays are provided to lock the relay armatures in either one of their two extreme positions and means controlled by the solenoid circuits for energizing said locking means at the beginning of every shifting cycle and maintaining said locking means only for a period of time substantially equal to the time within which a shifting cycle occurs and thereafter release said locking means in spite of the energization of said solenoid circuits.

21. In a gear shifting mechanism, a plurality of interrelated speed-changing gear controls, means for moving said gear control to change speeds, voltage responsive means for controlling each gear control moving means, means for interlocking said voltage responsive means so that only one active gear position is selected at one time, and means for generating an electric current at a voltage proportional to the driven speed for controlling said voltage responsive means.

22. In a gear shifting mechanism, a plurality of interrelated speed changing gear controls, means for moving a gear control from one position to another, electro-magnetic means responsive to the speed at the output of said gear shifting mechanism for selecting one of the gear control moving means to move a gear control from one position to another and electro-magnetic means inductively coupled to said first electromagnetic means for locking said speed responsive means only during the gear shifting.

23. In a gear shifting mechanism having a power input and output with a series of gear ratios with each ratio suitable for a particular output speed range, means for generating a voltage proportional to the speed at the output of said mechanism, means responsive to the generated voltage to select a gear ratio determined by the output speed then, and means for biasing said voltage responsive means to a gear ratio selecting position when the output speed is at the upper portion of the range for that particular gear ratio and for biasing said voltage responsive means to a gear ratio discarding position when the output speed is at the lower portion of the range for that particular gear ratio.

24. The system of claim 23 wherein a plurality of voltage responsive means are provided, each voltage responsive means being operative over a different voltage range and wherein means are provided for interlocking said voltage responsive means to prevent more than one voltage responsive means from responding at any one time.

ROBERT L. KAHN.